US010986122B2

(12) United States Patent
Bloxham et al.

(10) Patent No.: US 10,986,122 B2
(45) Date of Patent: Apr. 20, 2021

(54) IDENTIFYING AND REMEDIATING PHISHING SECURITY WEAKNESSES

(71) Applicant: Sophos Limited, Abingdon (GB)

(72) Inventors: Brady Bloxham, Pleasant Grove, UT (US); Scott McVicker Epple, Sudbury, MA (US); Jeffrey Philip Albert, Lowell, MA (US)

(73) Assignee: Sophos Limited, Abingdon (GB)

( * ) Notice: Subject to any disclaimer, the term of this patent is extended or adjusted under 35 U.S.C. 154(b) by 37 days.

(21) Appl. No.: 15/666,894

(22) Filed: Aug. 2, 2017

(65) Prior Publication Data

US 2018/0041537 A1 Feb. 8, 2018

Related U.S. Application Data

(60) Provisional application No. 62/370,171, filed on Aug. 2, 2016.

(51) Int. Cl.
*H04L 29/06* (2006.01)
*H04W 12/02* (2009.01)
(Continued)

(52) U.S. Cl.
CPC ...... *H04L 63/1483* (2013.01); *H04L 63/0263* (2013.01); *H04L 63/10* (2013.01);
(Continued)

(58) Field of Classification Search
CPC . H04L 63/1483; H04L 63/0263; H04L 63/10; H04L 63/1433; H04L 63/20;
(Continued)

(56) References Cited

U.S. PATENT DOCUMENTS

| 8,028,335 B2* | 9/2011 | Udezue | G06F 21/51 |
| | | | 726/22 |
| 8,220,047 B1* | 7/2012 | Soghoian | H04L 51/14 |
| | | | 709/206 |

(Continued)

FOREIGN PATENT DOCUMENTS

| WO | WO-2012068255 | 5/2012 |
| WO | WO-2015123544 | 8/2015 |
| WO | WO-2019156786 | 8/2019 |

OTHER PUBLICATIONS

Caputo, Deanna D.; Pfleeger, Shari Lawrence; Freeman, Jesse D.; Johnson, M. Eric; "Going Spear Phishing: Exploring Embedded Training and Awareness", Security & Pricacy, IEEE, vol. 12, Issue 1, Aug. 26, 2013, pp. 28-38.*

(Continued)

*Primary Examiner* — Victor Lesniewski
(74) *Attorney, Agent, or Firm* — Strategic Patents, P.C.

(57) ABSTRACT

A threat management facility generates a simulated phishing threat based on one or more characteristics of a network user. Based on whether the user fails to respond appropriately to the simulated phishing threat, the threat management facility may implement one or more prophylactic measures to remediate the security weakness exposed by the user's failure to respond appropriately to the simulated phishing threat. For example, a security policy for an endpoint associated with the user may be adjusted to address the security weakness. Additionally, or alternatively, the user may be enrolled in training directed at reducing the likelihood that the user will be the victim of an actual phishing attack in the future.

18 Claims, 6 Drawing Sheets

(51) Int. Cl.
*H04W 12/03* (2021.01)
*H04W 12/122* (2021.01)
*H04W 12/126* (2021.01)
*H04W 12/128* (2021.01)

(52) U.S. Cl.
CPC .......... *H04L 63/1433* (2013.01); *H04L 63/20* (2013.01); *H04W 12/02* (2013.01); *H04W 12/03* (2021.01); *H04W 12/122* (2021.01); *H04W 12/126* (2021.01); *H04W 12/128* (2021.01); *H04L 63/1416* (2013.01)

(58) Field of Classification Search
CPC .............. H04L 63/1416; H04W 12/03; H04W 12/122; H04W 12/126; H04W 12/128; H04W 12/02; G06F 21/577
See application file for complete search history.

(56) References Cited

U.S. PATENT DOCUMENTS

| | | | |
|---|---|---|---|
| 8,423,483 B2 | 4/2013 | Sadeh-Koniecpol et al. | |
| 8,484,741 B1* | 7/2013 | Chapman | G06Q 10/0635 726/25 |
| 8,615,807 B1 | 12/2013 | Belani et al. | |
| 8,635,703 B1 | 1/2014 | Belani et al. | |
| 8,910,287 B1* | 12/2014 | Belani | H04L 63/1483 726/23 |
| 8,955,109 B1 | 2/2015 | Satish | |
| 9,009,834 B1* | 4/2015 | Ren | G06F 21/10 709/224 |
| 9,076,342 B2 | 7/2015 | Brueckner et al. | |
| 9,256,739 B1 | 2/2016 | Roundy et al. | |
| 9,373,267 B2 | 6/2016 | Sadeh-Koniecpol et al. | |
| 9,384,677 B2 | 7/2016 | Donovan et al. | |
| 9,398,029 B2 | 7/2016 | Ferrara et al. | |
| 9,473,533 B2* | 10/2016 | Faltyn | H04W 12/0027 |
| 9,483,742 B1* | 11/2016 | Ahmed | H04L 63/1441 |
| 9,547,998 B2 | 1/2017 | Wescoe et al. | |
| 10,298,602 B2* | 5/2019 | Higbee | H04L 63/1483 |
| 2005/0204162 A1 | 9/2005 | Rayes et al. | |
| 2006/0281056 A1 | 12/2006 | Ouderkirk et al. | |
| 2007/0027992 A1* | 2/2007 | Judge | G06Q 10/107 709/227 |
| 2007/0107059 A1* | 5/2007 | Chasin | H04L 63/126 726/23 |
| 2009/0089859 A1* | 4/2009 | Cook | H04L 51/12 726/3 |
| 2009/0119740 A1* | 5/2009 | Alperovitch | H04L 63/20 726/1 |
| 2011/0296519 A1* | 12/2011 | Ide | G06F 21/30 726/13 |
| 2012/0124671 A1 | 5/2012 | Fritzson et al. | |
| 2014/0032691 A1* | 1/2014 | Barton | G06F 21/604 709/206 |
| 2014/0199964 A1 | 7/2014 | Sadeh-Koniecpol et al. | |
| 2014/0230060 A1* | 8/2014 | Higbee | H04L 63/1425 726/24 |
| 2014/0230061 A1* | 8/2014 | Higbee | H04L 63/1416 726/24 |
| 2014/0282816 A1* | 9/2014 | Xie | H04L 63/0227 726/1 |
| 2015/0188949 A1* | 7/2015 | Mahaffey | H04W 12/0027 726/1 |
| 2015/0229664 A1 | 8/2015 | Hawthorn et al. | |
| 2015/0264084 A1* | 9/2015 | Kashyap | H04L 63/1483 726/22 |
| 2015/0287336 A1* | 10/2015 | Scheeres | G09B 5/02 434/156 |
| 2015/0312266 A1 | 10/2015 | Thomas | |
| 2015/0319178 A1* | 11/2015 | Desai | G06F 9/452 726/1 |
| 2016/0014151 A1* | 1/2016 | Prakash | H04L 63/1483 726/22 |
| 2016/0057167 A1* | 2/2016 | Bach | H04L 63/101 726/23 |
| 2016/0164886 A1 | 6/2016 | Thrash et al. | |
| 2016/0269440 A1* | 9/2016 | Hartman | H04L 63/1483 |
| 2016/0301705 A1* | 10/2016 | Higbee | G06F 16/35 |
| 2016/0301716 A1 | 10/2016 | Sadeh-Koniecpol et al. | |
| 2016/0330238 A1 | 11/2016 | Hadnagy | |
| 2017/0103674 A1 | 4/2017 | Sadeh-Koniecpol et al. | |
| 2017/0104778 A1 | 4/2017 | Shabtai | |
| 2017/0126729 A1* | 5/2017 | Oberheide | H04L 63/1491 |
| 2017/0251009 A1* | 8/2017 | Irimie | H04L 63/20 |
| 2017/0318046 A1* | 11/2017 | Weidman | H04L 63/14 |
| 2019/0245894 A1 | 8/2019 | Epple et al. | |
| 2019/0303583 A1* | 10/2019 | Hosking | G09B 5/00 |

OTHER PUBLICATIONS

Jansson, Kenny; von Solms, Rossouw; "Simulating Malicious Emails to Educate End Users on-Demand", 3rd Symposium on Web Society, IEEE, Oct. 26-28, 2011, pp. 74-80.*
IPO, "UK Application No. 1712415.7 Search Report dated Dec. 15, 2017", 5 pages.
ISA, "PCT Application No. PCT/US19/13823 International Search Report and Written Opinion dated Mar. 20, 2019", 13 pages.
USPTO, "U.S. Appl. No. 15/890,763 Non-Final Office Action dated May 22, 2020", 41 pages.
USPTO, "U.S. Appl. No. 15/890,763 Notice of Allowance dated Oct. 7, 2020", 11 pages.

* cited by examiner

IDENTIFYING AND REMEDIATING PHISHING SECURITY WEAKNESSES

CROSS-REFERENCE TO RELATED APPLICATIONS

This application claims the benefit of U.S. Prov. Pat. App. No. 62/370,171, filed on Aug. 2, 2016, the entire contents of which are hereby incorporated herein by reference.

BACKGROUND

Phishing threats are a common and persistent concern for operators of computing networks. While significant, automated, technology based solutions may be employed to harden networks against outside intrusions, it is much more difficult to protect a network against threats that originate through an authorized network user. Because of this, phishing style attacks are commonly employed by would-be intruders. Phishing attacks frequently involve "social engineering" techniques, whereby the attacker attempts to exploit an unsophisticated or simply careless network user into giving up his or her access credentials or otherwise provide an unobstructed avenue for the attacker to access a network.

Because such attacks rely more on user behaviors than on the technical aspects of a network, user training is commonly used to attempt to reduce the likelihood of a network compromise due to phishing. Given the limitations associated with designing and rolling out user training, however, user training may have limited impact on modifying user behavior. Further, the behavioral changes produced by user training vary from user to user, leading to unpredictable results. Therefore, there exists a need for more reliably accounting for the role of user behavior in phishing security weaknesses of networks.

SUMMARY

A threat management facility generates a simulated phishing threat based on one or more characteristics of a network user. Based on whether the user fails to respond appropriately to the simulated phishing threat, the threat management facility may implement one or more prophylactic measures to remediate the security weakness exposed by the user's failure to respond appropriately to the simulated phishing threat. For example, a security policy for an endpoint associated with the user may be adjusted to address the security weakness. Additionally, or alternatively, the user may be enrolled in training directed at reducing the likelihood that the user will be the victim of an actual phishing attack in the future.

According to one aspect, a system for improving security of computer networks by identifying and remediating phishing security weaknesses associated with a particular user identifier may include one or more endpoints coupled to an enterprise network, and a threat management facility for the enterprise network in a communicating relationship with the one or more endpoints, the threat management facility including a processor and a memory, the memory bearing computer executable code configured to be executed by the processor to perform the steps of: selecting a security weakness for a user identifier associated with a user in the enterprise network; generating a response object corresponding to the security weakness, wherein access to the response object identifies an action by the user exposing the security weakness; generating an electronic communication containing the response object; transmitting the electronic communication to the user; detecting a request from an endpoint for the response object; determining that a threat assessment failure related to the security weakness has occurred based on detecting the request for the response object; communicating an adjustment for a security policy for the endpoint to a network device; adjusting a security policy for the endpoint to address the security weakness based on the threat assessment failure; and restricting access to resources by the endpoint in response to the security policy.

In certain implementations, the threat management facility may be in a communicating relationship with the one or more endpoints via a heartbeat system. Additionally, or alternatively, the network device may be an endpoint, a firewall, or a wireless access point. Further in addition or instead, the response object may be a Uniform Resource Locator (URL).

According to another aspect, a method for improving security of computer networks by identifying and remediating phishing security weaknesses associated with a particular user identifier may include selecting a security weakness for a user identifier associated with a user in an enterprise network, generating a response object corresponding to the security weakness, wherein access to the response object identifies an action by the user exposing the security weakness, generating an electronic communication containing the response object, transmitting the electronic communication to the user, detecting a request from an endpoint for the response object, determining that a threat assessment failure related to the security weakness has occurred based on detecting the request for the response object, and adjusting a security policy for the endpoint to address the security weakness based on the threat assessment failure.

In certain implementations, adjusting the security policy for the endpoint may include increasing detection sensitivity for at least one of a static detection antimalware agent, a dynamic behavior antimalware agent, a firewall, a blacklist, and a whitelist. Further or instead, adjusting the security policy may include updating one or more security programs to a most recent version. Still further or in the alternative, adjusting the security policy may include limiting at least one of application usage or network usage.

In some implementations, the method may further include adjusting the security policy for one or more additional computing devices associated with the user.

In certain implementations, the electronic communication may include at least an attached document, the user identifier, and executable code embedded within the attached document, the executable code configured transmit the response object and the user identifier from the endpoint when the attached document is opened. For example, the electronic communication may include human readable text including an instruction to the user to open the attached document. Additionally, or alternatively, the attached document may be of a file type associated with one or more of a word processing file, a spreadsheet file, an accounting file, an archive file, an image file, a presentation file, and a database file.

In some implementations, the method may further include, in response to detecting the request for the response object, providing educational material to the user, the education material including training content associated with the security weakness. Additionally, or alternatively, the method may include tracking progress of the user through the training content and retesting the user on adherence to the training content after a predetermined interval.

In certain implementations, generating the electronic communication may include customizing the electronic communication for the user. For example, generating the electronic communication may include customizing the electronic communication for at least one of a name, the user identifier, a title, or an organizational role of the user.

In certain implementations, the security weakness may include one or more of a phishing vulnerability and missing security updates.

In some implementations, the method may further include, in response to detecting the request for the response object, automatically enrolling the user in a program including training content associated with the security weakness.

According to another aspect, a computer program product for improving security of computer networks by identifying and remediating phishing security weaknesses associated with a particular user identifier may include non-transitory computer executable code embodied in a non-transitory computer readable medium that, when executing on one or more computing devices, performs the steps of: selecting a security weakness for a user identifier associated with a user in an enterprise network; generating a response Uniform Resource Locator (URL) corresponding to the security weakness, wherein access to the response URL identifies an action by the user exposing the security weakness; generating an electronic communication containing the response URL; transmitting the electronic communication to the user; detecting a request from an endpoint for the response URL; determining that a threat assessment failure related to the security weakness has occurred based on detecting the request for the response URL; and adjusting a security policy for the endpoint to address the security weakness based on the threat assessment failure. As an example, adjusting the security policy for the endpoint may include increasing detection sensitivity for at least one of a static detection antimalware agent, a dynamic behavior antimalware agent, a firewall, a blacklist, and a whitelist.

BRIEF DESCRIPTION OF THE FIGURES

The foregoing and other objects, features, and advantages of the devices, systems, and method described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION

Embodiments will now be described with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "third," "above," "below," and the like, are words of convenience and are not to be construed as limiting terms unless expressly state otherwise.

Figure 1:
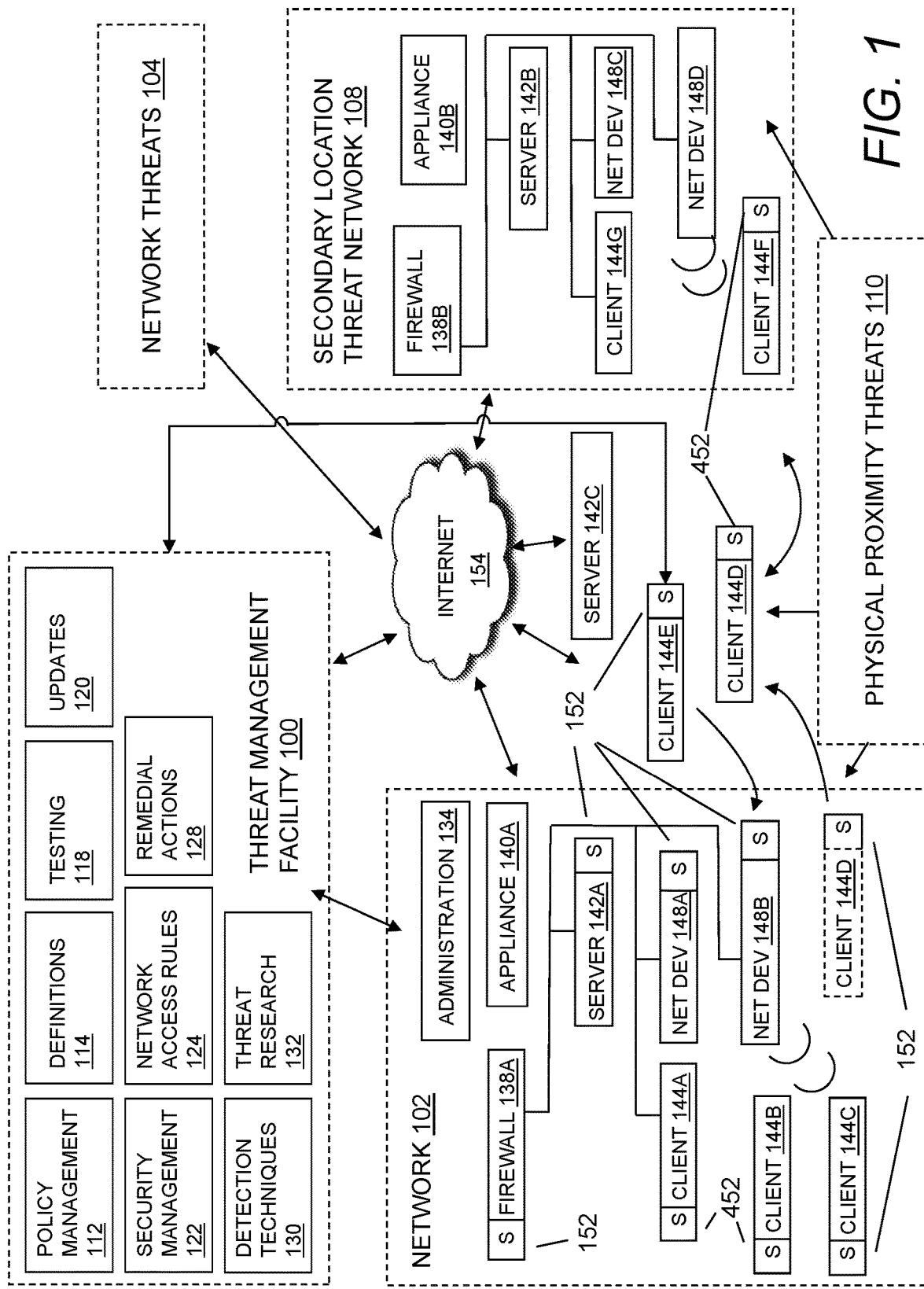
FIG. 1 illustrates an environment for threat management.

FIG. 1 illustrates an environment for threat management. Specifically, FIG. 1 depicts a block diagram of a threat management facility 100 providing protection to one or more enterprises, networks, locations, users, businesses, etc. against a variety of threats—a context in which the techniques disclosed herein may usefully be deployed. The threat management facility 100 may be used to protect devices and assets (e.g., IoT devices or other devices) from computer-generated and human-generated threats. For example, a corporation, school, web site, homeowner, network administrator, or other entity may institute and enforce one or more policies that control or prevents certain network users (e.g. employees, residents, users, guests, etc.) from accessing certain types of applications, devices, resources generally or in a particular manner. Policies may be created, deployed and managed, for example, through the threat management facility 100, which may update and monitor network devices, users, and assets accordingly.

The threat of malware or other compromise may be present at various points within a network 102 such as laptops, desktops, servers, gateways, communication ports, handheld or mobile devices, IoT devices, firewalls. In addition to controlling or stopping malicious code, a threat management facility 100 may provide policy management to control devices, applications, or users that might otherwise undermine productivity and network performance within the network 102.

The threat management facility 100 may provide protection to network 102 from computer-based malware, including viruses, spyware, adware, Trojans, intrusion, spam, policy abuse, advanced persistent threats, uncontrolled access, and the like. In general, the network 102 may be any networked computer-based infrastructure or the like managed by the threat management facility 100, such as an organization, association, institution, or the like, or a cloud-based facility that is available for subscription by individuals. For example, the network 102 may be a corporate, commercial, educational, governmental, or other network 102, and may include multiple networks, computing resources, and other facilities, may be distributed among more than one geographical locations, and may include an administration facility 134, a firewall 138A, an appliance 140A, a server 142A, network devices 148A-B, clients 144A-D, such as IoT devices or other devices. It will be understood that any reference herein to a client or client facilities may include the clients 144A-D shown in FIG. 1 and vice-versa. Further, the recitation of an element number ending with a letter should be understood to refer to a particular instance of the element, and the recitation of an element number without a letter should be understood to refer to any one or more instances of the element. Thus, for example, the recitation of the client 144A should be understood to refer only to the specific instance of the client labeled 144A in FIG. 1, while the recitation of the clients 144 should be understood to refer to any one or more instances of the client labeled 144A, 144B, 144C, 144D, 144E, 144F, 144G in FIG. 1, unless otherwise specified or made clear from the context.

The threat management facility 100 may include computers, software, or other computing facilities supporting a plurality of functions, such as one or more of a security management facility 122, a policy management facility 112, an update facility 120, a definitions management facility 114, a network access rules facility 124, a remedial action facility 128, a detection techniques facility 130, a testing facility 118, a threat research facility 132, and the like. In embodiments, the threat protection provided by the threat management facility 400 may extend beyond the network boundaries of the network 102 to include clients 144D (or client facilities) that have moved into network connectivity not directly associated with or controlled by the network 102. Threats to client facilities may come from a variety of sources, such as from network threats 104, physical proximity threats 110, a secondary location threat network 108, and the like. Clients 144A-D may be protected from threats even when the client 144A-D is not directly connected to or in association with the network 102, such as when a client 144E-F moves in and out of the network 102, for example when interfacing with an unprotected server 142C through the Internet 154, when a client 144F is moving into the secondary location threat network 108 such as interfacing with components that are not protected (e.g., the appliance 140B, the server 142B, the network devices 148C, 148D, and the like).

The threat management facility 100 may use or may be included in an integrated system approach to provide the network 102 with protection from a plurality of threats to device resources in a plurality of locations and network configurations. The threat management facility 100 may also or instead be deployed as a stand-alone solution. For example, some or all of the threat management facility 100 components may be integrated into a server or servers at a remote location, for example in a cloud computing facility. For example, some or all of the threat management facility 100 components may be integrated into a firewall, gateway, or access point within or at the border of the network 102. In some embodiments, the threat management facility 100 may be integrated into a product, such as a third-party product (e.g., through an application programming interface), which may be deployed on endpoints, on remote servers, on internal servers or gateways for a network, or some combination of these.

The security management facility 122 may include a plurality of elements that provide protection from malware to device resources of the network 102 in a variety of ways, including endpoint security and control, email security and control, web security and control, reputation-based filtering, control of unauthorized users, control of guest and non-compliant computers, and the like. The security management facility 122 may include a local software application that provides protection to one or more device resources of the network 402. The security management facility 122 may have the ability to scan client facility files for malicious code, remove or quarantine certain applications and files, prevent certain actions, perform remedial actions and perform other security measures. This may include scanning some or all of the files stored on the client facility or accessed by the client facility on a periodic basis, scanning an application when the application is executed, scanning data (e.g., files or other communication) in transit to or from a device, etc. The scanning of applications and files may be performed to detect known or unknown malicious code or unwanted applications.

The security management facility 122 may provide email security and control. The security management facility 122 may also or instead provide for web security and control, such as by helping to detect or block viruses, spyware, malware, unwanted applications, and the like, or by helping to control web browsing activity originating from client devices. In certain embodiments, the security management facility 122 may provide for network access control, which may provide control over network connections. In addition, network access control may control access to virtual private networks (VPN) that provide communications networks tunneled through other networks. The security management facility 122 may provide host intrusion prevention through behavioral based analysis of code, which may guard against known or unknown threats by analyzing behavior before or while code executes. Further, or instead, the security management facility 122 may provide reputation filtering, which may target or identify sources of code.

In embodiments, the security management facility 122 may use wireless characteristics to identify a device on the network 102. For example, the security management facility 122 may determine a reliability index value of any one or more devices (e.g., the servers 142, the clients 144, and combinations thereof) connected via a wireless link to the network 102, for example, an IoT device. Through one or more access points (e.g., the firewall 138A) or other sensor (e.g., the appliance 140A) in the network 102, the security management facility 122 may monitor RF characteristics of the IoT device to obtain current RF characteristics. The security management facility 122 may compare the current RF characteristics to baseline RF characteristics, and when there is a match between the current RF characteristics and the baseline RF characteristics based on the comparison, adjust the reliability index value to indicate greater reliability, and when there is not a match between the current RF characteristics and the baseline RF characteristics based on the comparison, adjusting the reliability index value to indicate lesser reliability, and when the reliability index value exceeds a threshold value, performing an action to reduce a potential threat of the IoT device to the network. This aspect of the security management facility 122 may also take place on the firewall 138A (e.g., an access point) or appliance 140A.

In general, the security management facility 122 may support overall security of the network 102 using the various techniques described above, optionally as supplemented by updates of malicious code information and so forth for distribution across the network 102.

The administration facility 134 may provide control over the security management facility 122 when updates are performed. Information from the security management facility 122 may also be sent from the enterprise back to a third party, a vendor, or the like, which may lead to improved performance of the threat management facility 100.

The policy management facility 112 of the threat management facility 100 may be configured to take actions, such as to block applications, users, communications, devices, and so on based on determinations made. The policy management facility 112 may employ a set of rules or policies that determine network 102 access permissions for one or more of the clients 144. In some embodiments, a policy database may include a block list, a black list, an allowed list, a white list, or the like, or combinations of the foregoing, that may provide a list of resources internal or external to the network 102 that may or may not be accessed by the clients 144. The policy management facility 112 may also or instead include rule-based filtering of access requests or resource requests, or other suitable techniques for controlling access to resources consistent with a corresponding policy.

In embodiments, the policy management facility 112 may include reliability index thresholds for devices, such as IoT devices. The policy management facility 112 may include policies to permit or deny access, to take remedial action, to issue alerts, and so on based on particular reliability index determinations.

The policy management facility 112 may also or instead provide configuration policies to be used to compare and control the configuration of applications, operating systems, hardware, devices, and the like associated with the network 102. An evolving threat environment may dictate timely updates, and thus the update management facility 120 may also be provided by the threat management facility 100. In addition, the policy management facility 112 may require update management (e.g., as provided by the update facility 120 herein described). In embodiments, the update management facility 120 may provide for patch management or other software updating, version control, and so forth.

The security facility 122 and policy management facility 112 may push information to the network 102 and/or to a given one or more of the clients 144. The network 102 and/or one or more of the clients 144A-F may also or instead request information from the security facility 122 and/or from the policy management facility 112, the servers 142A-C, or there may be a combination of pushing and pulling of information. In some embodiments, the policy management facility 112 and the security facility 122 management update modules may work in concert to provide information to the network 102 and/or to one or more of the clients 144A-F facility for control of applications, devices, users, and so on.

As threats are identified and characterized, the threat management facility 100 may create updates that may be used to allow the threat management facility 100 to detect and remediate malicious software, unwanted applications, configuration and policy changes, and the like. The definitions management facility 114 may contain threat identification updates, also referred to as definition files. A definition file may be a virus identity file that may include definitions of known or potential malicious code. The virus identity definition files may provide information that may identify malicious code within files, applications, or the like. The definition files may be accessed by the security management facility 122 when scanning files or applications within the client facility for the determination of malicious code that may be within the file or application. The definitions management facility 114 may include a definition for a neural network or other recognition engine. The definitions management facility 114 may provide timely updates of definition files information to the network, client facilities, and the like.

In embodiments, the definitions management facility 114 may include default values or baseline values for RF characteristics of devices, such as IoT devices. For example, the definitions management facility 114 may include a baseline value for particular RF characteristics of a particular IoT device.

The security management facility 122 may be used to scan an outgoing file and verify that the outgoing file is permitted to be transmitted per rules and policies of the network 102. By checking outgoing files, the security management facility 122 may be able to discover malicious code infected files that were not detected as incoming files.

The threat management facility 100 may provide controlled access to the network 102. For example, the network access rules facility 124 may be responsible for determining if an application running on a given one or more of the clients 144 should be granted access to a requested network resource. In some embodiments, the network access rules facility 124 may verify access rights for one or more of the client facilities to or from the network 102 or may verify access rights of computer facilities to or from external networks. When network access for a client facility is denied, the network access rules facility 124 may send an information file to the client facility (e.g., a command or command file that the remedial action facility 428 may access and take action upon). The network access rules facility 124 may include one or more databases including one or more of a block list, a black list, an allowed list, a white list, a reputation list, an unacceptable network resource database, an acceptable network resource database, a network resource reputation database, or the like. The network access rules facility 124 may incorporate rule evaluation. Rule evaluation may, for example, parse network access requests and apply the parsed information to network access rules. The network access rule facility 124 may also or instead provide updated rules and policies to the network 102.

When a threat or policy violation is detected by the threat management facility 100, the threat management facility 100 may perform or initiate remedial action through the remedial action facility 128. Remedial action may take a variety of forms, such as terminating or modifying an ongoing process or interaction, issuing an alert, sending a warning (e.g., to a client or to the administration facility 134) of an ongoing process or interaction, executing a program or application to remediate against a threat or violation, record interactions for subsequent evaluation, and so forth. The remedial action may include one or more of blocking some or all requests to a network location or resource, performing a malicious code scan on a device or application, performing a malicious code scan on one or more of the clients 144, quarantining a related application (or files, processes or the like), terminating the application or device, isolating the application or device, moving a process or application code to a sandbox for evaluation, isolating one or more of the clients 144 to a location or status within the network that restricts network access, blocking a network access port from one or more of the clients 144, reporting the application to the administration facility 134, or the like, as well as any combination of the foregoing.

In embodiments, remedial action may be taken based on a reliability index determination based on RF characteristics of a wireless device.

Remedial action may be provided as a result of a detection of a threat or violation. The detection techniques facility 130 may include tools for monitoring the network 102 or managed devices within the network 102. The detection techniques facility 130 may provide functions such as monitoring activity and stored files on computing facilities. Detection techniques, such as scanning a computer's stored files, may provide the capability of checking files for stored threats, either in the active or passive state. Detection techniques such as streaming file management may be used to check files received at the network 102, a gateway facility, a client facility, and the like.

Verifying that the threat management facility 100 detects threats and violations to established policy, may require the ability to test the system, either at the system level or for a particular computing component. The testing facility 118 may allow the administration facility 134 to coordinate the testing of the security configurations of computing facilities of the clients 144 on the network 102. For example, the administration facility 134 may be able to send test files to a set of computing facilities of the clients 144 to test the ability of a given client facility to determine acceptability of the test file. After the test file has been transmitted, a recording facility may record the actions taken by one or more of the clients 144 in reaction to the test file. The recording facility may aggregate the testing information from the clients 144 and report the testing information to the administration facility 134. The administration facility 134 may be able to determine the level of preparedness of the respective clients 144 based on the reported information. Remedial action may be taken for any of the clients 144 as determined by the administration facility 134.

The threat management facility 100 may provide threat protection across the network 102 to devices such as the clients 144, the servers 142, the administration facility 134, the firewall 138, a gateway, one or more of the network devices 148 (e.g., hubs and routers), one or more of the appliances 140 (e.g., a threat management appliance), any number of desktop or mobile users, and the like. As used herein, the term endpoint may refer to any compute instance running on a device that can source data, receive data, evaluate data, buffer data, process data or the like (such as a user's desktop computer, laptop, IoT device, server, etc.). This may, for example, include any client devices as well as other network devices and the like within the network 102, such as a firewall or gateway (as a data evaluation endpoint computer system), a laptop (as a mobile endpoint computer), a tablet (as a hand-held endpoint computer), a mobile phone, or the like. The term endpoint may also or instead refer to any final or intermediate source or destination for data within a network 102. An endpoint computer security facility 152 may be an application locally loaded onto any corresponding computer platform or computer support component, either for local security functions or for management by the threat management facility 100 or other remote resource, or any combination of these.

The network 102 may include a plurality of client facility computing platforms (e.g., the clients 144) on which the endpoint computer security facility 152 is installed. A client facility computing platform may be a computer system that is able to access a service on another computer, such as one or more of the servers 142, via a network. The endpoint computer security facility 152 may, in corresponding fashion, provide security in any suitable context such as among a plurality of networked applications, for a client facility connecting to an application server facility, for a web browser client facility connecting to a web server facility, for an e-mail client facility retrieving e-mail from an Internet 154 service provider's mail storage servers or web site, and the like, as well as any variations or combinations of the foregoing. As used herein, any one or more of the application server facility, the web server facility, and the mail storage servers should be understood to include one or more of the servers 142.

The network 102 may include one or more of the servers 142, such as application servers, communications servers, file servers, database servers, proxy servers, mail servers, fax servers, game servers, web servers, and the like. The servers 142, which may also be referred to as server facilities 142, server facility 142 applications, server facility 142 operating systems, server facility 142 computers, or the like, may be any device(s), application program(s), operating system(s), or combination of the foregoing that accepts client facility connections to service requests from the clients 144. In embodiments, the threat management facility 100 may provide threat protection to server facilities 142 within the network 102 as load conditions and application changes are made.

The server facilities 142 may include an appliance facility 140, where the appliance facility 140 provides specific services to other devices on the network 102. The server facilities may also include simple appliances utilized across the network 102 infrastructure, such as switches, routers, hubs, gateways, print servers, modems, and the like. These appliances may provide interconnection services within the network 102, and therefore may advance the spread of a threat if not properly protected.

The clients 144 may be protected from threats from within the network 102 using a local or personal firewall, which may be a hardware firewall, software firewall, or a combination thereof, that controls network traffic to and from a client. The local firewall may permit or deny communications based on a security policy. The endpoint computer security facility 152 may additionally protect the firewall 138A, which may include hardware or software, in a stand-alone device or integrated with another network component, that may be configured to permit, deny, or proxy data through the network 102.

The interface between the threat management facility 100 and the network 102, and through the appliance 140 to embedded endpoint computer security facilities, may include a set of tools that may be the same or different for various implementations, and may allow each network administrator to implement custom controls. In embodiments, these controls may include both automatic actions and managed actions. The administration facility 134 may configure policy rules that determine interactions. The administration facility 134 may also establish license management, which in turn may further determine interactions associated with licensed applications. In embodiments, interactions between the threat management facility 100 and the network 102 may provide threat protection to the network 102 by managing the flow of network data into and out of the network 102 through automatic actions that may be configured by the threat management facility 100 for example by action or configuration of the administration facility 134.

The clients 144 within the network 102 may be connected to the network 102 by way of the network devices 148A-B, which may be wired devices or wireless facilities. The clients 144 may be mobile wireless facilities and, because of their ability to connect to a wireless network access point, may connect to the Internet 154 outside the physical boundary of the network 102, and therefore outside the threat-protected environment of the network 102. Such mobile wireless facilities, if not for the presence of a locally-installed endpoint computer security facility 152, may be exposed to a malware attack or perform actions counter to policies of the network 102. Thus, the endpoint computer security facility 152 may provide local protection against various threats and policy violations. The threat management facility 100 may also or instead be configured to protect the out-of-enterprise facility mobile client facility (e.g., the clients 144) through interactions over the Internet 154 (or other network) with the locally-installed endpoint computer security facility 152. Thus, mobile client facilities that are components of the network 102 but temporarily outside connectivity with the network 102 may be provided with the same or similar threat protection and policy control provided to the clients 144 inside the network 102. In addition, mobile client facilities (e.g., the clients 444) may receive the same interactions to and from the threat management facility 100 as client facilities 144 inside the enterprise facility 102, such as by receiving the same or equivalent services via an embedded endpoint computer security facility 152.

Interactions between the threat management facility 100 and the components of the network 102, including mobile client facility extensions of the network 102, may ultimately be connected through the Internet 154 or any other network or combination of networks. Security-related or policy-related downloads and upgrades to the network 102 may be passed from the threat management facility 100 through to components of the network 102 equipped with the endpoint computer security facility 152. In turn, the endpoint computer security facilities 152 of the enterprise facility 102 may upload policy and access requests back across the Internet 154 and through to the threat management facility 100. The Internet 154, however, is also the path through which threats may be transmitted from their source, and one or more of the endpoint computer security facilities 152 may be configured to protect a device outside the network 102 through locally-deployed protective measures and through suitable interactions with the threat management facility 100.

Thus, if the mobile client facility were to attempt to connect into an unprotected connection point, such as at the secondary location threat network 108 that is not a part of the network 102, the mobile client facility, such as one or more of the clients 144, may be required to request network interactions through the threat management facility 100, where contacting the threat management facility 100 may be performed prior to any other network action. In embodiments, the endpoint computer security facility 152 of the client 144 may manage actions in unprotected network environments such as when the client facility (e.g., the client 144F) is in a secondary location 108, where the endpoint computer security facility 152 may dictate which applications, actions, resources, users, etc. are allowed, blocked, modified, or the like.

The secondary location threat network 108 may have no endpoint computer security facilities 152 as a part of its components, such as the firewall 138B, the server 142B, the client 144G, the network devices 448C-D (e.g., hubs and routers), and the like. As a result, the components of the secondary location threat network 108 may be open to threat attacks, and may become potential sources of threats, as well as any mobile enterprise facility clients (e.g., the clients 144B-F) that may be connected to the secondary location threat network 108. In such instances, these components may now unknowingly spread a threat to other devices connected to the network 102.

Some threats do not come directly from the Internet 154. For example, one or more physical proximity threats 110 may be deployed on a client device while that device is connected to an unprotected network connection outside the network 102 and, when the client device is subsequently connected to one or more of the clients 144 on the network 402, the device can deploy malware or otherwise pose a threat. In embodiments, the endpoint computer security facility 152 may protect the network 102 against these types of physical proximity threats 110, for instance, through scanning any device prior to allowing data transfers, through security validation certificates, through establishing a safe zone within the network 102 to receive data for evaluation, and the like.

Figure 2:
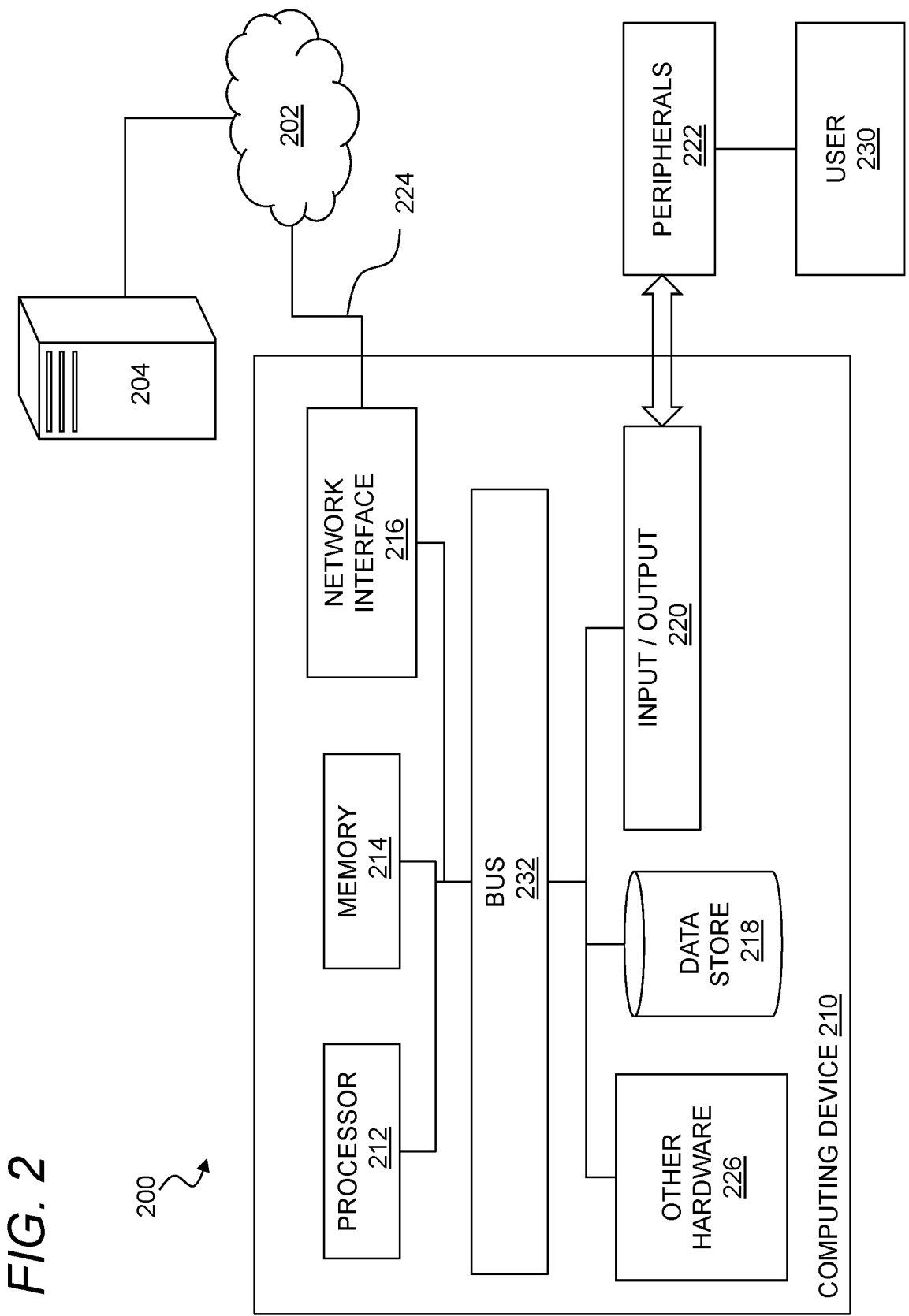
FIG. 2 illustrates an exemplary computer system.

FIG. 2 illustrates a computer system. In general, the computer system 200 may include a computing device 210 connected to a network 202, for example, through an external device 204. The computing device 210 may be or may include any type of network endpoint or endpoints as described herein such as, for example, the network endpoints described above with reference to FIG. 1. For example, the computing device 210 may include a desktop computer workstation. The computing device 210 may also or instead be any suitable device that has processes and communicates over the network 202 including, without limitation, a laptop computer, a desktop computer, a personal digital assistant, a tablet, a mobile phone, a television, a set top box, a wearable computer (e.g., watch, jewelry, or clothing), a home device (e.g., a thermostat or a home appliance controller), just as some examples. The computing device 210 may also or instead include a server, or it may be disposed on a server.

The computing device 210 may be used for any of the entities described in the threat management environment described above with reference to FIG. 1. For example, the computing device 210 may be a server, a client an enterprise facility, a threat management facility, or any of the other facilities or computing devices described therein. In certain aspects, the computing device 210 may be implemented using hardware (e.g., in a desktop computer), software (e.g., in a virtual machine or the like), or a combination of software and hardware, and the computing device 210 may be a standalone device, a device integrated into another entity or device, a platform distributed across multiple entities, or a virtualized device executing in a virtualization environment.

The network 202 may include any network described above, e.g., data network(s) or internetwork(s) suitable for communicating data and control information among participants in the computer system 200. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.) or WiMax-Advanced (IEEE 802.16m)) and/or other technologies, as well as any of a variety of corporate area, metropolitan area, campus or other local area networks or enterprise networks, along with any switches, routers, hubs, gateways, and the like that might be used to carry data among participants in the computer system 200. The network 202 may also include a combination of data networks, and need not be limited to a strictly public or private network.

The external device 204 may be any computer or other remote resource that connects to the computing device 210 through the network 202. This may include threat management resources such as any of those contemplated above, gateways or other network devices, remote servers or the like containing content requested by the computing device 210, a network storage device or resource, a device hosting malicious content, or any other resource or device that might connect to the computing device 210 through the network 202.

The computing device 210 may include a processor 212, a memory 214, a network interface 216, a data store 218, and one or more input/output devices 220. The computing device 210 may further include or be in communication with peripherals 222 and other external input/output devices 224.

The processor 212 may be any as described herein, and in general may be capable of processing instructions for execution within the computing device 210 or computer system 200. The processor 212 may include a single-threaded processor or a multi-threaded processor. The processor 212 may be capable of processing instructions stored in the memory 214 or on the data store 218.

The memory 214 may store information within the computing device 210 or computer system 200. The memory 214 may include any volatile or non-volatile memory or other computer-readable medium, including without limitation a Random-Access Memory (RAM), a flash memory, a Read Only Memory (ROM), a Programmable Read-only Memory (PROM), an Erasable PROM (EPROM), registers, and so forth. The memory 214 may store program instructions, program data, executables, and other software and data useful for controlling operation of the computing device 200 and configuring the computing device 200 to perform functions for a user. The memory 214 may include a number of different stages and types for different aspects of operation of the computing device 210. For example, a processor (e.g., the processor 212) may include on-board memory and/or cache for faster access to certain data or instructions, and a separate, main memory or the like may be included to expand memory capacity as desired.

The memory 214 may, in general, include a non-volatile computer readable medium containing computer code that, when executed by the computing device 200 creates an execution environment for a computer program in question (e.g., code that constitutes processor firmware, a protocol stack, a database management system, an operating system, or a combination of the foregoing, and/or code that performs some or all of the steps set forth in the various flow charts and other algorithmic descriptions set forth herein). While the memory 214 is depicted as a single memory, it will be understood that any number of memories may be usefully incorporated into the computing device 210. For example, a first memory may provide non-volatile storage such as a disk drive for permanent or long-term storage of files and code even when the computing device 210 is powered down. A second memory such as a random-access memory may provide volatile (but higher speed) memory for storing instructions and data for executing processes. A third memory may be used to improve performance by providing even higher speed memory physically adjacent to the processor 212 for registers, caching and so forth.

The network interface 216 may include any hardware and/or software for connecting the computing device 210 in a communicating relationship with other resources through the network 202. This may include remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or other media that might be used to carry data between the computing device 210 and other devices. The network interface 216 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 216 may include any combination of hardware and software suitable for coupling the components of the computing device 210 to other computing or communications resources and, thus, may typically include one or more communication channels 224 and be connected to one or more networks (e.g., the network 202). By way of example and not limitation, this may include electronics for wired or wireless transmission of information over the network 202 either wirelessly or through a physical connection, depending on the needs of a specific implementation. As an example, the communication may be via an Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 202 such as the Internet. This may also or instead include hardware/software for a WiMax connection or a cellular network connection (using, e.g., CDMA, GSM, LTE, or any other suitable protocol or combination of protocols). The network interface 216 may be included as part of the input/output devices 220 or vice-versa.

The data store 218 may be any internal memory store providing a computer-readable medium such as a disk drive, an optical drive, a magnetic drive, a flash drive, or other device capable of providing mass storage for the computing device 210. The data store 218 may store computer readable instructions, data structures, program modules, and other data for the computing device 210 or computer system 200 in a non-volatile form for subsequent retrieval and use. For example, the data store 218 may store without limitation one or more of the operating system, application programs, program data, databases, files, and other program modules or other software objects and the like.

The input/output interface 220 may support input from and output to other devices that might couple to the computing device 210. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices. It will be understood that, while the network interface 216 for network communications is described separately from the input/output interface 220 for local device communications, these two interfaces may be the same, or may share functionality, such as where a USB port is used to attach to a WiFi accessory, or where an Ethernet connection is used to couple to a local network attached storage.

A peripheral 222 may include any device used to provide information to or receive information from the computing device 200. This may include human input/output (I/O) devices such as a keyboard, a mouse, a mouse pad, a track ball, a joystick, a microphone, a foot pedal, a camera, a touch screen, a scanner, or other device that might be employed by the user 230 to provide input to the computing device 210. This may also or instead include a display, a speaker, a printer, a projector, a headset or any other audiovisual device for presenting information to a user. The peripheral 222 may also or instead include a digital signal processing device, an actuator, or other device to support control or communication to other devices or components. Other I/O devices suitable for use as a peripheral 222 include haptic devices, three-dimensional rendering systems, augmented-reality displays, magnetic card readers, and so forth. In one aspect, the peripheral 222 may serve as the network interface 216, such as with a USB device configured to provide communications via short range (e.g., BlueTooth, WiFi, Infrared, RF, or the like) or long range (e.g., cellular data or WiMax) communications protocols. In another aspect, the peripheral 222 may provide a device to augment operation of the computing device 210, such as a global positioning system (GPS) device, a security dongle, or the like. In another aspect, the peripheral may be a storage device such as a flash card, USB drive, or other solid-state device, or an optical drive, a magnetic drive, a disk drive, or other device or combination of devices suitable for bulk storage. More generally, any device or combination of devices suitable for use with the computing device 200 may be used as the peripheral 222 as contemplated herein.

Other hardware 226 may be incorporated into the computing device 200. Examples of the other hardware 226 include a co-processor, a digital signal processing system, a math co-processor, a graphics engine, a video driver, and so forth. The other hardware 226 may also or instead include expanded input/output ports, extra memory, additional drives (e.g., a DVD drive or other accessory), and so forth.

A bus 232 or combination of busses may serve as an electromechanical platform for interconnecting components of the computing device 200, such as the processor 212, the memory 214, the network interface 216, the other hardware 226, the data store 218, and an input/output interface. As shown in the figure, each of the components of the computing device 210 may be interconnected using the bus 232 or other communication mechanism for communicating information.

Methods and systems described herein can be realized using the processor 212 of the computer system 200 to execute one or more sequences of instructions contained in the memory 214 to perform predetermined tasks. In embodiments, the computing device 200 may be deployed as a number of parallel processors synchronized to execute code together for improved performance, or the computing device 200 may be realized in a virtualized environment where software on a hypervisor or other virtualization management facility emulates components of the computing device 200 as appropriate to reproduce some or all of the functions of a hardware instantiation of the computing device 200.

Figure 3:
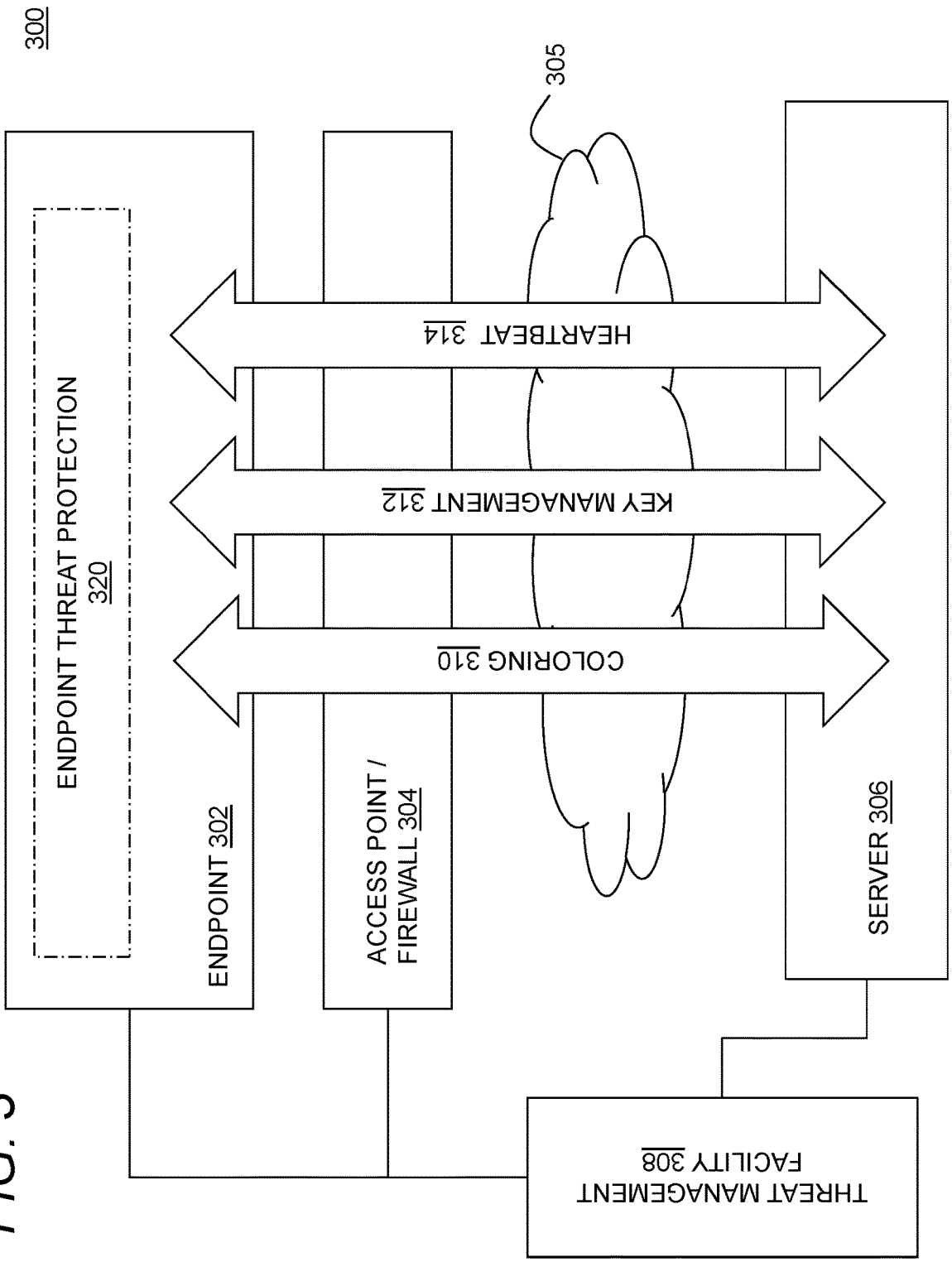
FIG. 3 illustrates a threat management system.

FIG. 3 illustrates an exemplary threat management system 300 as contemplated herein. In general, the threat management system may include an endpoint 302 for example, a laptop, or a device such as an IoT device, an access point 304, a server 306 and a threat management facility 308 in communication with one another directly or indirectly through a data network 305, for example, as generally described above. Each of the entities depicted in FIG. 3, may, for example, be implemented on one or more computing devices such as the computing device described above with reference to FIG. 2.

A number of systems may be distributed across these various components to support threat management, for example, including a coloring system 310, a key management system 312 and a heartbeat system 314, each of which may include software components executing on any of the foregoing system components, and each of which may communicate with the threat management facility 308 or an endpoint threat protection agent 320 executing on an endpoint 302, on an access point or a firewall 304, or on a server 306 to support improved threat detection and remediation.

The coloring system 310 may be used to label or 'color' software objects for improved tracking and detection of potentially harmful activity. The coloring system 310 may, for example, label files, executables, processes, network communications, data sources and so forth with any suitable label. A variety of techniques may be used to select static and/or dynamic labels for any of these various objects, and to manage the mechanics of applying and propagating coloring information as appropriate. For example, a process may inherit a color from an application that launches the process. Similarly, a file may inherit a color from a device when it is created or opened by a device, and/or a process may inherit a color from a file that the process has opened. More generally, any type of labeling, as well as rules for propagating, inheriting, changing, or otherwise manipulating such labels, may be used by the coloring system 310 as contemplated herein. A color may be or may be based on one or more reliability index values, the meeting of one or more reliability index thresholds, the rate of change of one or more reliability index values, etc. A color of a device may be used in a security policy. A color of a process, a file, a network request, and so on may be based on a color of a device, and that color may be used in a security policy.

The key management system 312 may support management of keys for the endpoint 302 in order to selectively permit or prevent access to content on the endpoint 302 on a file-specific basis, a process-specific basis, an application-specific basis, a user-specific basis, or any other suitable basis in order to prevent data leakage, and in order to support more fine-grained and immediate control over access to content on the endpoint 302 when a security compromise is detected. Thus, for example, if a particular process executing on the endpoint is compromised, or potentially compromised or otherwise under suspicion, keys to that process may be revoked in order to prevent, for example, data leakage or other malicious activity. In embodiments, keys on device may be revoked based on one or more reliability index values, the meeting of one or more reliability index thresholds, the rate of change of one or more reliability index values, etc.

The heartbeat system 314 may be used to provide periodic or aperiodic information from an endpoint about system health, security, status, etc. A heartbeat may be encrypted or plaintext, or some combination of these, and may be communicated unidirectionally (e.g., from the endpoint 302 to the threat management facility 308) or bidirectionally (e.g., between the endpoint 302 and the server 306, or any other pair of system components) on a useful schedule.

In implementations, the access point or firewall 304 may use the heartbeat 314 to report a potential or actual compromise of a device based, for example, on a color of the device, or based on one or more reliability index values, the meeting of one or more reliability index thresholds, the rate of change of one or more reliability index values, etc. The heartbeat 314 from the access point 304 may be communicated to the server 306, for example, and administrative server or directly or indirectly to a threat management facility 308. If the endpoint device 302 has an endpoint threat protection facility 320, the endpoint threat protection facility 320 may be used to investigate further the status, or to take remedial measures, again by communication using the secure heartbeat 314.

In general, these various monitoring and management systems may cooperate to provide improved threat detection and response. For example, the coloring system 310 may be used to evaluate when a particular device is potentially compromised, and a potential threat may be confirmed based on an interrupted heartbeat from the heartbeat system 314 or by information communicated in a heartbeat. The key management system 312 may then be used to revoke keys to a process so that no further files can be opened, deleted or otherwise modified. More generally, the cooperation of these systems enables a wide variety of reactive measures that can improve detection and remediation of potential threats to an endpoint.

Figure 4:
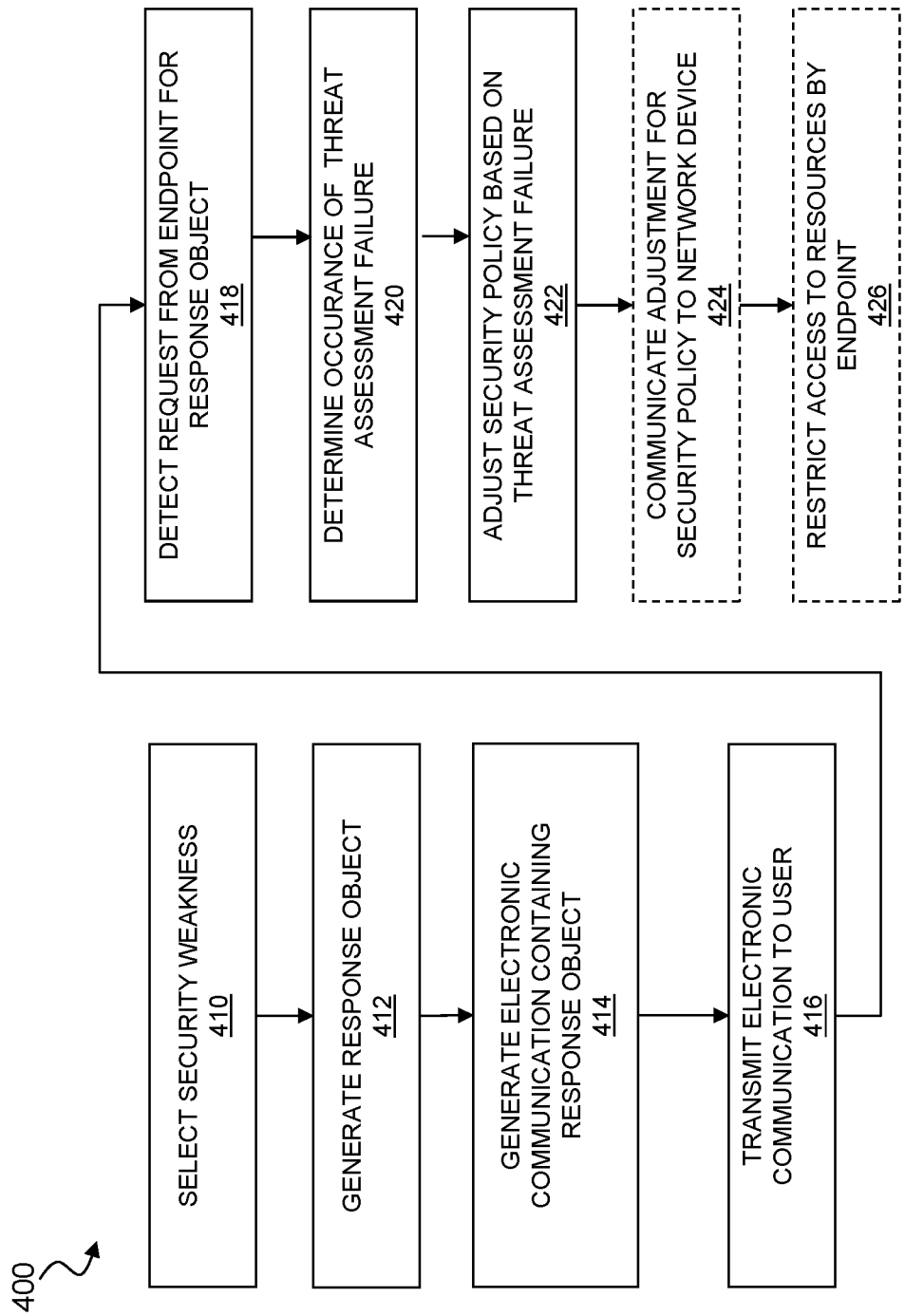
FIG. 4 is a flow diagram of an exemplary embodiment of a method for identifying and remediating phishing security weaknesses associated with a particular user identifier.

FIG. 4 shows an exemplary method 400 for identifying and remediating phishing security weaknesses associated with a particular user identifier. In general, the exemplary method 400 may be implemented by any one or more of the threat management facilities disclosed herein and in a communicating relationship (e.g., via a heartbeat system, such as the heartbeat system 314 in FIG. 3) with one or more endpoints coupled to an enterprise network. For example, any one or more of the threat management facilities disclosed herein may include a processor and a memory, the memory bearing computer executable code configured to be executed by the processor to perform one or more steps of the exemplary method 400. As described in greater detail below, the exemplary method 400 may result in the execution of prophylactic measures that may reduce the likelihood of a successful phishing attack on the one or more endpoints coupled to the enterprise network.

As shown in step 410, the method 400 may include selecting a security weakness for a user identifier associated with a user in an enterprise network. For example, the security weakness can include a phishing vulnerability. Additionally, or alternatively, the security weakness can include missing security updates. More generally, any hardware, software or behavioral security weakness that can be programmatically tested or monitored may be used as the security weakness discussed herein. This may, for example, include a software update pattern of a user, a response of a user to an administrative request such as a request to update an application, communication or storage of confidential information, usage patterns of network connections (e.g., cellular or public WiFi hotspots or the like), file download patterns, usage patterns for removable storage devices such as USB drives, poor or weak password selections, or any other resource usage patterns or the like that present potential vulnerabilities for an endpoint.

As shown in step 412, the method 400 may include generating a response object corresponding to the security weakness. For example, access to the response object may identify an action by the user exposing the security weakness, such as a tendency to select phishing hyperlinks, opening attachments from low-reputation sources, etc. It will be understood that the term 'object' as used herein may include any data, process, file or combination of these including without limitation any process, application, executable, script, dynamic linked library, file, data, database, data source, data structure, function, resource locator (e.g., uniform resource locator (URL) or other uniform resource identifier (URI)), or the like that might be manipulated by one of the computing devices described herein.

As shown in step 414, the method 400 may include generating an electronic communication containing the response object. In general, the electronic communication may include information useful for identifying a user's interaction with the electronic communication and, thus, identifying a user's response to the security weakness forming the basis of the response object. For example, the response object associated with the electronic communication may include at least an attached document, a user identifier, and executable code embedded within the attached document. The executable code may be configured to transmit, for example, the response object and, optionally, transmit the user identifier from the endpoint when the attached document is opened. In certain implementations, a file system on the endpoint may be additionally or alternatively monitored to detect file system activity related to the attached document, and the user identifier may be transmitted from the endpoint based upon detection of certain file system activity related to the attached document (e.g., opening the attached document). The attached document may be any of various different known document types that are commonly transmitted via electronic communications and, thus, more specifically may include any one or more of a word processing file, a spreadsheet file, an accounting file, an archive file, an image file, a presentation file, and a database file. Further, or instead, the electronic communication may include human readable text including instructions to the user to open the attached document or otherwise interact with the attached document in a manner emulating the launch of a threat at the endpoint.

In some implementations, the URL is for a resource on a publicly available location, such as a web site. In some implementations, the URL is for a resource on a private location, such as a private web site. In some implementations, the URL may be designed to be perceived by a user to be associated with a particular sender. In some implementations, the URL is for a resource on the user's device, such as a local file system, or on the user's network such as a shared drive or file system.

In certain implementations, generating the electronic communication can include customizing the electronic communication for the user. Examples of customizing the electronic communication for the user include, but are not limited to, the inclusion of a name, the user identifier, a title, or an organizational role of the user. Customizing may also or instead include tailoring content in a manner specific to a user's job responsibilities. For example, this may include disguising a communication as related to a financial transaction for transmittal to an accounting department, or otherwise adapting the communication so that it appears relevant to a user's role or responsibilities within an organization.

In certain implementations, and with the appropriate consents, customizing may also or instead include tailoring content to a user's interests or affiliations. For example, if the user is a bicycle enthusiast, the customizing may include a communication related to bicycles. In certain implementations, and with the appropriate consents, the customizing may also or instead include tailoring content to entities that have previously sent communications to the user. For example, if the user receives correspondence from a certain organization, such as a particular university, bicycle shop, or bank, just as a few examples, the customizing may include an appearance that the communication comes from that university, bicycle shop, or bank.

As shown in step 416, the method 400 may include transmitting the electronic communication to the user.

As shown in step 418, the method 400 may include detecting a request from an endpoint for the response object. In response to detecting the request from the endpoint for the response object, one or more of various different actions may be implemented to reduce the likelihood that the security weakness may compromise the network in the event of an actual phishing threat. For example, in response to detecting the request for the response object, the user may be automatically enrolled in a program including training content associated with the security weakness. Further, or instead, in response to detecting the request for the response object, the user may be provided with educational material (e.g., educational material including training content associated with the security weakness).

In certain implementations, the method 400 may further include tracking one or more parameters probative of the delivery, effectiveness, or both of the training content assigned to the user. Tracking such parameters may be useful, for example, for increasing user compliance, such as in implementations in which the user is made aware that the user's interaction with the training content is being monitored. Thus, for example, the progress of the user through the training content may be tracked and, optionally, reminders may be provided to the user regarding completion of the training content. Further, or instead, the user may be retested on adherence to the training content after a predetermined interval.

As shown in step 420, the method 400 may include determining occurrence of a threat assessment failure related to the security weakness. In general, such determination of the threat assessment failure may be based upon detecting activity related to interaction with the response object on the endpoint.

As shown in step 422, the method 400 may include adjusting a security policy for the endpoint based on the threat assessment failure. In general, the security policy may control interaction between the endpoint and any one or more types of objects, including any one or more types of objects corresponding to the response object. For example, the security policy may control access by the endpoint to any one or more types of objects. Further, or instead, the security policy may control the ability of the endpoint to send any one or more types of objects to other endpoints on the network.

While the adjustment to the security policy for the endpoint may be binary with respect to the threat assessment failure, the threat assessment failure may further or instead form a basis for non-binary adjustments to the security policy. For example, the threat assessment failure may be included in a threat index for the user. The threat index may form a basis for incrementally adjusting one or more aspect of the security policy for the endpoint over a range. As an example, the threat index can form a basis for a level of scrutiny applied to URLs requested by the endpoint. As a further or alternative example, the threat index can form a basis for throttling bandwidth for network access by the endpoint. In certain implementations, the threat index can form a basis for limiting attachments (e.g., one or more of size, number, type) to emails at the endpoint. The threat index may be a scalar such that any one or more adjustments to respective aspects of the security policy are based on the scalar. Alternatively, the threat index may be a vector, and adjustments to one or more aspects of the security policy may be made individually according to respective components of the vector. In certain implementations, the threat index may be a color associated with the endpoint. As an example, a color of a process, a file, a network request, and so on may be based on a color of the threat index associated with the endpoint, and that color may be used in a security policy.

The adjustment may address any one or more of various different weaknesses exposed by the threat assessment failure. In particular, the adjustment may address the security weakness exposed by the user's interaction with the response object. In certain implementations, adjusting the security policy for the endpoint may include increasing detection sensitivity of one or more aspects of a threat management facility. For example, detection sensitivity may be increased for at least one of a static detection antimalware agent, a dynamic behavior antimalware agent, a firewall, a blacklist, and a whitelist. For severe vulnerabilities, this may include terminating or limiting network connectivity for a user, or limiting use of applications such as web browsers, electronic mail clients, or messaging clients that might otherwise expose a user to external threats. In some implementations, adjusting the security policy may include updating one or more security programs to a most recent version. Further, or instead, adjusting the security policy may include limiting at least one of application usage by the endpoint or network usage by the endpoint.

As shown in step 424, the method 400 may optionally include communicating an adjustment for a security policy for the endpoint to a network device, such as any one or more of the network devices disclosed herein. Thus, for example, the adjustment for the security policy for the endpoint may be communicated to any one or more of an endpoint (e.g., another endpoint), a firewall, and a wireless access point.

As shown in step 426, the method 400 may further or instead include restricting access to resources by the endpoint in response to the security policy. Thus, for example, as the security policy changes in response to the threat assessment failure, the accessibility to resources by the endpoint may change. In this way, therefore, the accessibility to resources by a given endpoint in the network may reflect a detected susceptibility of the user associated with the given endpoint to certain types of phishing attacks. Such targeted restrictions may be useful, for example, for reducing the likelihood of a successful phishing attack without unduly restricting a user's access to resources, such as resources that may have legitimate uses. For example, the endpoint may not be permitted to access domains on the interne based on URL that is communicated in an email and that has a low reputation.

While certain implementations have been described, other implementations are additionally or alternatively possible.

For example, while adjustments to the security policy have been described as being directed to a single endpoint associated with a user, it should be appreciated that other strategies for improving the security of a network are within the scope of the present disclosure. For example, the method 400 may further include adjusting the security policy for one or more additional computing devices (e.g., endpoints) associated with the user.

As another example, while the security policies have been described as controlling interactions between the endpoint and objects based on the type of object, it should be appreciated that other types of security policies are within the scope of the present disclosure. As an example, the security policy may include evaluating a reputation of an e-mail and a reputation of a user (e.g., according to a threat index). Based on the reputation of the e-mail and the reputation of the user, the security policy can determine the parameters for interaction between the user associated with the endpoint and an object received in the e-mail. For example, in instances in which the object is a URL, the security policy can permit or limit access to the URL by the endpoint based on a reputation of the e-mail through which the URL was provided and based on a threat index of a user associated with the endpoint. As a specific example, a low reputation user can be blocked from accessing a URL received through an e-mail flagged as risky.

Figure 5:
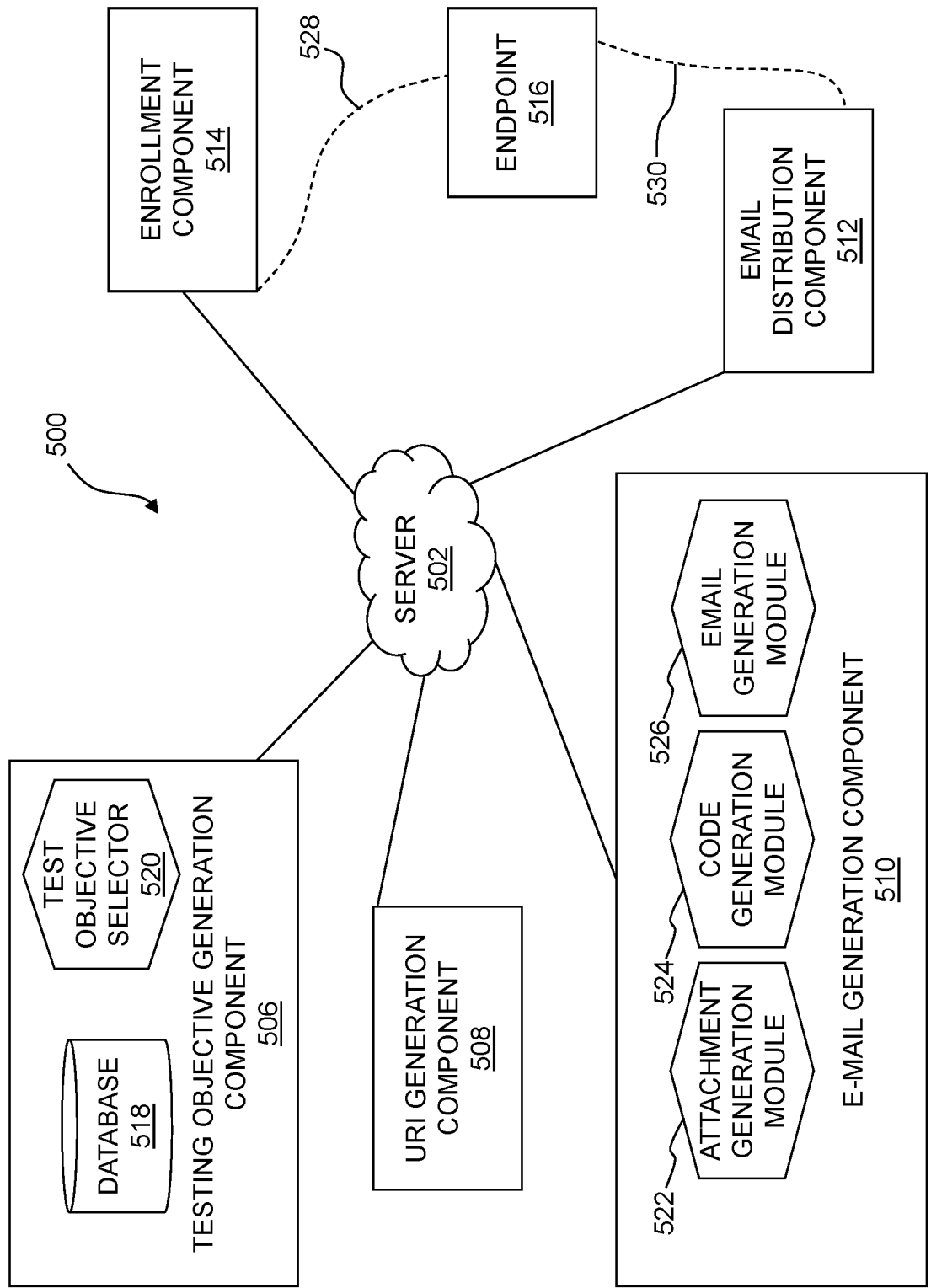
FIG. 5 illustrates an exemplary system for generating an attachment-based, simulated phishing attack.

As yet another example, referring to FIG. 5, a system 500 for executing an email attachment based simulated phishing attack is illustrated. The system 500 includes a server 502 including a testing objective generation component 506, a URL generation component 508, an email generation component 510, an email distribution component 512, a training content enrollment component 514, and an endpoint 516 associated with a user. The server 502 may operate according to the processor 212 and utilize the memory 214 of FIG. 2. The server 502 may utilize the testing objective generation component 506 to select an appropriate or desirable simulated testing objective. In some embodiments, the testing objective generation component 506 may utilize a test objective selector 520 in conjunction with a database 518 to identify testing objectives. In certain embodiments, the database 518 may include information about network users including, for example, demographic information like age and/or gender, and professional information like job title, job description, department, access levels, commonly utilized IT platforms, and the like.

By utilizing both the database 518 and the test objective selector 520 of the testing objective generation component 506, the server 502 may identify a suitable simulated testing objective. In certain implementations, once an objective has been identified, the server 508 may generate a URI pointing to training content related to the determined test objective. In some embodiments, the URI may be a URL or any other network resource locator accessible by a user to reach the training content module.

Once the server 502 has generated a URI at the testing objective generation component 508, the email generation component 510 may generate, on the fly, a customized attachment-based phishing email. It should be noted that the e-mail generation component 510 may include individual modules such as one or more of an attachment generation module 522, a code generation module 524, and an e-mail generation module 526. Generation of e-mails by the e-mail generation component 510 may include generating a document via the attachment generation module 522. In some embodiments, this document may be a Microsoft Office document like a Word, Excel, or PowerPoint document. Other attachment formats are additionally or alternatively possible. For instance, in some embodiments, the attachment generation module 522 may generate a document of a file type frequently accessed by the user 516 in the ordinary course of business, such as an accounting file, an archive file, a database file, or any other file type attachable to an electronic communication (e.g., email, instant message, SMS message, or other electronic message broadcast).

While the modules 522, 524, 526 are illustrated as separate, it should be appreciated that one or more of the modules 522, 524, 526 may be combined with one another or a single module may be configured to perform multiple tasks.

The attachment generation module 522 may also, or instead, interact with the code generation module 524 during the attachment generation process. The code generation module 224 may, for example, generate executable code incorporable into the attachment file by the attachment generation module 522. It should be noted that the executable code may be generated separately from the attachment document itself and then embedded within the document at a later time or the attachment generation module 222 may use the code generation module 224 to generate the attachment and embed the code in a single action. In general, the code may be configured to execute arbitrary code on the computing system of the endpoint 516 associated with the user in the event that the user opens the attached document. In certain embodiments, such arbitrary code may launch a web browser and load the URI generated by the URI generation component 508. In some embodiments, the URI point to a local network resource accessible outside of a web-browser. In such embodiments, the executable code may be configured to cause the computing system of endpoint 516 to load the local network resource in a suitable manner (e.g., in a system file browser or other pre-installed software on user 216s computing system).

The code generation module 524 may incorporate the URI—in whatever form it is created by the URI generation component 508—into the executable code to be utilized by the attachment generation module 522. Additionally, or alternatively, the code generation module 524 may utilize a unique user identifier in conjunction with the URI to uniquely identify the user associated with the endpoint 516 when a threat assessment is failed by opening the attached document and allowing execution of the arbitrary code.

In some embodiments, the unique ID may also be generated at the URI generation component 208 during, for example, the initial URI generation step. Alternatively, or in addition, the email generation component 510 may incorporate the unique identifier into the executable code and embedded within the attachment document, as described above. Further, in some embodiments, the unique identifier may be provided by the database 518 during, for example, generation of the testing objective. Still further or instead, one or more of the URI generation component 508, and the e-mail generation component 510 may generate a unique identifier for each user, depending on which component is utilized to identify the unique ID.

The unique ID may be beneficial in these embodiments because, for example, it facilitates directly tracking the user by the system when a threat assessment is failed. Additionally, or alternatively, by incorporating a unique ID into the URI component, certain capabilities may be enabled at the network location corresponding to the URI that would not be enabled otherwise. For instance, a unique ID may facilitate customization of the landing location to the user in a manner such as adding the user's name or other user specific information derived from, for instance, the database 518. In some embodiments, the unique ID may be useful for directly or automatically enrolling the user in customized training content, rather than requiring the user to otherwise reach the generic URI location and then perform a registration or other self-identification process.

Based on the generation and addition of the unique ID to the URI at the code generation module 524, the email generation component 510 may generate an email (or, in some embodiments, an alternative type of electronic communication) at the email generation module 226 and attach the document and embedded code with the unique identifier to the email. In some embodiments, the email generation module 526 may include instructions within the appropriate email body area to the user associated with the endpoint 516, with the directions directing the user to open the attached document. Such instructions may be customized to the user using, for example, information derived from the database 518 about the user, from some other data store, or both. In some embodiments, personal information about the user, the user's job, the user's job responsibilities, or other information that is designed to strengthen the asserted validity of the simulated attack may be included. As will be discussed in further detail below with respect to FIG. 6, learning algorithms may determine certain types or examples of customizations that have been effective on other users and apply predictions regarding similar customizations that may be effective for simulation of a phishing threat directed to the present user.

Once an email with an attached document has been generated as discussed above, the email may be distributed by the server 502 through the email distribution component 512 (to the particular user identified by the unique identifier) over the network 530. The network 530 may be an internal network or external network. Further, the email may be delivered to the user on any of a plurality of devices (e.g., the endpoint 516). Depending on the format of the email attachment, the effectiveness of the simulated phishing attack may be different on different devices. For that reason, the email generation component 510 may utilize the attachment generation module 522 to create an attachment formatted for a specific device or may choose an attachment formatted for more than one device, depending on the determination made by the testing objective generation component 506.

Upon opening the attached document and execution of the embedded code, the endpoint 516 associated with the user would be caused to load the enrollment component 514 located at the URI embedded within the attachment. Further, because the URI also includes the unique identifier, the enrollment component 514 may automatically enroll the user associated with the endpoint 5 in the training content associated with the URI, which may be associated with the type of simulated attack the user failed and, thus, the type of simulated attack for which the user has demonstrated a training need.

Finally, after auto enrollment of the user in the training content, in some embodiments the enrollment component 514 may communicate with the server 502 to report on the user's enrollment in training and, further or instead, to provide specifics of the training content and route taken by the user to reach failure. In some embodiments, this information may be stored in the database 518 and, at a later date, may form a basis for generating new testing objectives for the same user. Alternatively, or in addition, the data may be stored in the database 518 to provide an analytical dataset that may form a basis for generating testing objectives for users other than the user associated with the endpoint 516.

In certain implementations, a method for enrolling a user in customized, computer-based training as the result of a failed simulated threat assessment may include selecting at least one detectable security weakness for at least one user. A unique enrollment URL for a threat assessment training content may be generated. The URL may identify, at a first computing system (e.g., the server 502), the location of an automated enrollment platform for training content. Additionally, or in the alternative, the training content may be directed at least to the predicted security weakness associated with the user.

Based on at least the predicted weakness, an electronic communication may be generated and customized for the user being testing. The electronic message may include at least an attached document of a file type appropriate for the user. Additionally, the attached document may include executable code embedded within. The executable code may be configured, for example, to load the unique enrollment URL and the user identifier when the attached document is opened. Further, the opening of the attachment and the execution of the code may constitute an indication from the endpoint 516 to the server 502 that a threat assessment failure has occurred.

The customized email including the attached document may be sent to the user by way of any suitable electronic messaging format. Based on the unique threat assessment training content URL being loaded on the user computing system (indicating a threat assessment failure), the user identifier may be automatically provided with access to view the training content associated with the corresponding security weakness.

The progress of the user identifier may be tracked through utilization of the training content and the user may, optionally, be retested for adherence to the training content. Alternatively, or in addition, the user may be tested on a different predicted security weakness.

In some embodiments, the electronic communication may further, or instead, include user readable text including at least an instruction to open the attached documents. For example, such a message may be customized to appear to originate from a trusted source such as a manager, IT department employee, or other known system from which or from whom the user is accustomed to receive electronic messages.

Figure 6:
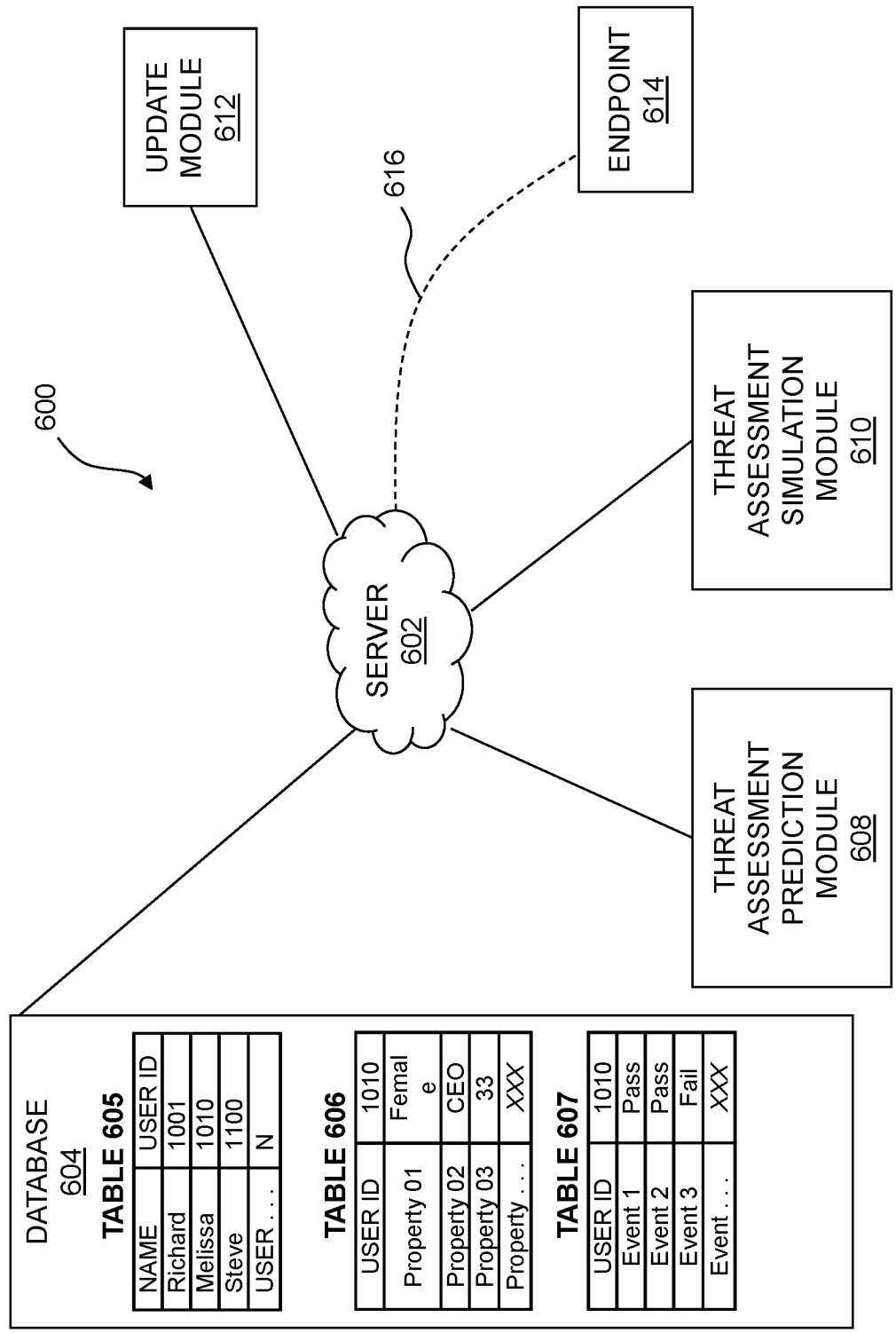
FIG. 6 illustrates an exemplary system for predicting a testable threat vector or a computer system user based on known user properties and associated known threat outcomes.

FIG. 6 illustrates a system 600 for predicting a testable threat vector or a computer system user based on known user properties and associated known threat outcomes. For example, the system 600 may predict a suitable test event directed at user associated with an endpoint 614. In system 600, a server 602 may include a database 604 including tables 605, 606, and 607. The server 602 may further include one or more of a threat assessment prediction module 608, a threat assessment simulation module 610, and an update module 612. A user associated with the endpoint 614 may interact with the system 600 over a network 616.

The threat assessment prediction module 608 may utilize one or more of the tables 605, 606, and 607 to generate predictions as to what types of simulated threat assessments would be most likely to exploit the user associated with the endpoint 614 by applying one or more pattern recognition algorithms to data stored, for example, in the database 604. For example, the threat assessment prediction module 608 may consult the table 605 to derive information about a particular user. In such embodiments, the tables 606 and 607 may be keyed to the table 605 through, for example, a User ID field. Based on such keying, relational database techniques may be used to store different sets of data about a given user across multiple tables. For example, the threat assessment prediction module 608 may query the table 605 for a user (e.g., a user named "Melissa"), and a user ID (e.g., "1010") may be returned. The threat assessment prediction module 608 may then cross reference the given user ID against the table 306 to determine one or more properties about the user. In this specific example, properties 01, 02, and 03 may be provided. The property labeled "Property . . . " may be a place holder to represent that any number of properties may be stored in the table 606 within the bounds of the particular database technology deployed.

When the table 606 is queried, the properties of "Female," "CEO," and "33" may be returned. Properties within the table 606 may include items related to the demographics of a user, such as gender, age, education, or other demographic information. The properties may also, or instead, include properties related to the user's job details, such as job title, job function, access levels, commonly used platforms, etc. Providing user-level details such as these may result in at least two substantial benefits. First, the particular simulated threat for a user can be customized to the degree that details are provided about the user. That is, in general, the greater the level of detail, the more customization may be provided. Second, with more substantial user level data sets, better predictions may be available when those data items are compared to simulated threat outcomes. For instance, users having common properties "A" and "B" may be presented with the same simulation. In some cases, a first user may fail the simulation while a second user passes the simulation. Limited only to properties "A" and "B," it may be difficult to derive any understanding regarding why the first user failed the simulation while the second user did not. It should be appreciated, however, that knowledge of a greater number of properties about each user, may increase the likelihood that one or more of the additional properties will differ among the two users. These differences may provide a basis for predicting future outcomes to similar simulations, especially in implementations based on larger data sets containing substantially more users with substantially more properties.

In the threat assessment prediction module 608, the table 607 may also, or instead, be accessed to learn about past threat event outcomes. In such implementations, the table 307 may include three event outcomes for the user 1010 including "Pass" for "Event 1" and "Event 2" and "Fail" for "Event 3." In FIG. 6, it should be appreciated that the row including "Event . . . " is a place holder for the sake of clarity of representation and represents that any number of events may be stored in the table 607 within the bounds of the particular database technology deployed.

Once a particular threat prediction has been identified by the threat assessment prediction module 608 for the user associated with the endpoint 614, a corresponding simulated threat assessment may be generated by the threat assessment simulation module 610. The threat assessment simulation module 610 may, for example, generate a simulation in accordance with any one or more of the various procedures described herein, including any one or more of the various different procedures described above with respect to FIG. 5, or the simulation may be generated in another way. Based on the particular embodiment, the threat assessment simulation module 610 may generate a threat simulation in accordance with the identified prediction and, further or instead, may transmit that simulation to the endpoint 614 associated with the user.

Upon interaction with the simulated threat by the user associated with the endpoint 614, the server 602 may receive a simulation outcome over the network 616. Because the simulation was custom-built for the particular user, the outcome of the simulation may now be tied back to the corresponding user ID from the table 305 by storing the outcome in the table 307. In some embodiments, the update module 612 may take the simulation outcome from the user 614, query the database 604 for a matching User ID (included within the simulation by the threat assessment simulation module 610), and cause the database 604 to be updated at the corresponding tables 605, 606, and 607.

The threat assessment prediction module 608 may again query the newly updated database, applying pattern recognition algorithms to identify likely simulation types and user targets for those simulations.

In accordance with the systems described herein and, in particular in accordance with the system 600, a method for determining a threat assessment metric for a user may include accessing a database including a plurality of records including at least one property associated with a user identifier and associated with at least one threat assessment performance outcome that has been stored as a result of a threat assessment event.

The threat assessment prediction module 608 may derive one or more threat assessment prediction profiles by applying one or more pattern recognition algorithms to the plurality of records of the database 604. Such algorithms may include, for example, probabilistic inferences, anomaly detection, decision trees, training data sets, clustering, or any other suitable technique known in the art for analyzing data sets for predictive models.

After at least one prediction profile has been derived, a first plurality of properties may be determined for a first user. Based on those properties and on the assessment prediction profile, the first user may be assigned an initial threat assessment metric identifying at least one predicted threat vector for the first user.

Based at least on the initial threat assessment metric assigned to the first user identifier, a simulated threat assessment event, configured to test the first user identifier on at least the predicted threat vector, may be executed.

Based on the outcome of the simulated threat assessment event, at least one or more of the following may occur: the simulated threat assessment outcome may become associated with the first plurality of properties for the first user; an updated threat assessment metric for the first user may be generated by reapplying one or more of the threat assessment prediction profiles to the updated first plurality of properties; and the updated first plurality of properties for the first user may be added to the plurality of records of the database.

In some embodiments, the threat assessment prediction module 608 may query each of the tables 605, 606, and 607 of the database 604 and apply pattern recognition algorithms seeking to find common event outcomes in the table 307 based, for example, on the associated properties of the table 306. For instance, the threat assessment prediction module 608 may determine that a disproportionate number of users with the property of "Female" and an age greater than "30" fail "Event 3."

Based on a result of the prediction and continuing with this example, if a new user with properties that include "Female" and "30" is added, the threat assessment simulation module 610 may be configured to test the new user with a simulated event already determined appropriate for the new user based on her properties. In this way, the efficiency of the simulation system may be increased by eliminating, for example, the steps that would otherwise be involved with ascertaining the new user's threat characteristics solely through a trial and error process involving randomized or otherwise un-customized assignments of simulated tests. Such an improvement in efficiency of the simulation system may, for example, improve the security of the network 616.

Transmission media may include a network and/or data links which may be used to carry program code in the form of computer-executable instructions or data structures, and which may be accessed by a general-purpose or special-purpose computer system. As used herein, a "network" should be understood to include one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be understood to be included within the scope of computer-readable media.

Further, upon reaching various computer system components, program code in the form of computer-executable instructions or data structures may be transferred automatically from transmission media to computer storage media (or vice versa). For example, computer-executable instructions or data structures received over a network or data link may be buffered in RAM within a network interface module (e.g., a "NIC"), and then eventually transferred to computer system RAM and/or to less volatile computer storage media at a computer system. Thus, it should be understood that computer storage media may be included in computer system components that also (or even primarily) utilize transmission media.

Computer-executable instructions may include, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that, unless otherwise specified or made clear from the context, any one or more of the methods described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, virtual or augmented reality headsets, and the like. It should be further understood that any one or more of the methods described herein may also or instead be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that any one or more of the methods described herein may be implemented in a cloud computing environment. Cloud computing environments may be distributed, although this is not required. When distributed, cloud computing environments may be distributed internationally within an organization and/or have components possessed across multiple organizations. As used herein, "cloud computing" should be understood to include a model for enabling on-demand network access to a shared pool of configurable computing resources (e.g., networks, servers, storage, applications, and services). Further, or instead, "cloud computing" may result in any of a number of other advantages that may be obtained from such a model when properly deployed.

A cloud computing model may be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud-computing model may also, or instead, be deployed using different deployment models such as private cloud, community cloud, public cloud, hybrid cloud, and so forth.

Some embodiments, such as a cloud computing environment, may include a system that includes one or more hosts that are each capable of running one or more virtual machines. During operation, virtual machines may emulate an operational computing system, supporting an operating system and perhaps one or more other applications as well. In some embodiments, each host may include a hypervisor that emulates virtual resources for the virtual machines using physical resources that are abstracted from view of the virtual machines. The hypervisor may also, or instead, provide proper isolation between the virtual machines. Thus, from the perspective of any given virtual machine, the hypervisor may provide the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

Computer storage media shall be understood to include physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A system for improving security of computer networks by identifying and remediating phishing security weaknesses associated with a particular user identifier, the system comprising:
   one or more endpoints coupled to an enterprise network; and
   a threat management facility for the enterprise network in a communicating relationship with the one or more endpoints, the threat management facility including a processor and a memory, the memory bearing computer executable code configured to be executed by the processor to perform the steps of:
   selecting a security weakness for a user identifier associated with a user in the enterprise network;
   generating a response object corresponding to the security weakness, wherein access to the response object identifies an action by the user exposing the security weakness;
   generating an electronic communication containing the response object;
   transmitting the electronic communication to the user;
   detecting a request from an endpoint for the response object;

determining that a threat assessment failure has exposed the security weakness of the user on the endpoint based on detecting the request for the response object;

identifying one or more additional computing devices associated with the user based on a unique identifier for the user in the response object and a database of user information for the enterprise network;

communicating an adjustment for a security policy for the endpoint and the one or more additional computing devices associated with the user to a network device between the endpoint and a network external to the enterprise network;

at the network device, adjusting the security policy for the user identifier associated with the user, wherein adjusting the security policy includes limiting at least one of application usage or network usage for the user identifier to address the security weakness exposed by the threat assessment failure; and restricting access to resources by the endpoint and the one or more additional computing devices with the network device in response to the security policy.

2. The system of claim 1, wherein the threat management facility is in a communicating relationship with the one or more endpoints via a heartbeat system.

3. The system of claim 1, wherein the network device is an endpoint, a firewall, or a wireless access point.

4. The system of claim 1, wherein the response object is a Uniform Resource Locator (URL).

5. A method for improving security of computer networks by identifying and remediating phishing security weaknesses associated with a particular user identifier, the method comprising:

selecting a security weakness for a user identifier associated with a user in an enterprise network;

generating a response object corresponding to the security weakness, wherein access to the response object identifies an action by the user exposing the security weakness;

generating an electronic communication containing the response object;

transmitting the electronic communication to the user;

detecting a request from an endpoint for the response object;

determining that a threat assessment failure has exposed the security weakness of the user on the endpoint based on detecting the request for the response object;

identifying one or more additional computing devices associated with the user based on a unique identifier for the user in the response object and a database of user information for the enterprise network;

at a network device between the endpoint and a network external to the enterprise network, adjusting a security policy for the endpoint and the one or more additional computing devices associated with the user, wherein adjusting the security policy includes limiting at least one of application usage or network usage for the user identifier to address the security weakness exposed by the threat assessment failure; and controlling access to resources by the endpoint and the one or more additional computing devices with the network device based on the security policy.

6. The method of claim 5, wherein adjusting the security policy includes increasing detection sensitivity on the endpoint for at least one of a static detection antimalware agent, a dynamic behavior antimalware agent, a firewall, a blacklist, and a whitelist.

7. The method of claim 5, wherein adjusting the security policy includes updating one or more security programs to a most recent version.

8. The method of claim 5, wherein the electronic communication includes at least an attached document, the user identifier, and executable code embedded within the attached document, the executable code configured transmit the response object and the user identifier from the endpoint when the attached document is opened.

9. The method of claim 8, wherein the electronic communication includes human readable text including an instruction to the user to open the attached document.

10. The method of claim 8, wherein the attached document is of a file type associated with one or more of a word processing file, a spreadsheet file, an accounting file, an archive file, an image file, a presentation file, and a database file.

11. The method of claim 5, further comprising, in response to detecting the request for the response object, providing educational material to the user, the education material including training content associated with the security weakness.

12. The method of claim 11, further comprising tracking progress of the user through the training content and retesting the user on adherence to the training content after a predetermined interval.

13. The method of claim 5, wherein generating the electronic communication includes customizing the electronic communication for the user.

14. The method of claim 13, wherein generating the electronic communication includes customizing the electronic communication for at least one of a name, the user identifier, a title, or an organizational role of the user.

15. The method of claim 5, wherein the security weakness includes one or more of a phishing vulnerability and missing security updates.

16. The method of claim 5, further comprising, in response to detecting the request for the response object, automatically enrolling the user in a program including training content associated with the security weakness.

17. A computer program product for improving security of computer networks by identifying and remediating phishing security weaknesses associated with a particular user identifier, the computer program product comprising non-transitory computer executable code embodied in a non-transitory computer readable medium that, when executing on one or more computing devices, performs the steps of:

selecting a security weakness for a user identifier associated with a user in an enterprise network;

generating a response Uniform Resource Locator (URL) corresponding to the security weakness, wherein access to the response URL identifies an action by the user exposing the security weakness;

generating an electronic communication containing the response URL;

transmitting the electronic communication to the user;

detecting a request from an endpoint for the response URL;

determining that a threat assessment failure related to the security weakness of the user has occurred on the endpoint based on detecting the request for the response URL;

identifying one or more additional computing devices associated with the user based on a unique identifier for the user in the response URL and a database of user information for the enterprise network;

at a network device between the endpoint and a network external to the enterprise network, adjusting a security policy for the endpoint and the one or more additional computing devices associated with the user, wherein adjusting the security policy includes limiting at least one of application usage or network usage for the user identifier to address the security weakness exposed by the threat assessment failure; and controlling access to resources by the endpoint and the one or more additional computing devices with the network device based on the security policy.

18. The computer program product of claim 17, wherein adjusting the security policy includes increasing detection sensitivity on the endpoint for at least one of a static detection antimalware agent, a dynamic behavior antimalware agent, a firewall, a blacklist, and a whitelist.

\* \* \* \* \*